(12) United States Patent
Lee et al.

(10) Patent No.: US 8,248,683 B2
(45) Date of Patent: Aug. 21, 2012

(54) VARIABLE LIGHT TRANSMITTANCE WINDOW

(75) Inventors: Mi-Hyun Lee, Yongin-si (KR);
Myun-Gi Shim, Yongin-si (KR);
Dong-Gun Moon, Yongin-si (KR);
Soo-Ho Park, Yongin-si (KR);
Tae-Hyun Bae, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 12/982,791

(22) Filed: Dec. 30, 2010

(65) Prior Publication Data
US 2012/0033288 A1 Feb. 9, 2012

(30) Foreign Application Priority Data

Aug. 5, 2010 (KR) .................. 10-2010-0075668

(51) Int. Cl.
*G02F 1/01* (2006.01)
*G09G 3/34* (2006.01)

(52) U.S. Cl. ............ 359/288; 345/106; 349/16; 349/20; 252/583; 374/134

(58) Field of Classification Search .................. 359/288, 359/289, 359, 641, 885; 349/16, 20, 21, 349/86, 104, 161, 184, 187, 190; 252/583, 252/586; 503/201, 206, 215, 226; 428/34, 428/698; 250/517.1; 358/300
See application file for complete search history.

(56) References Cited

U.S. PATENT DOCUMENTS

| | | | |
|---|---|---|---|
| 3,789,421 A * | 1/1974 | Chivian et al. ................ 347/262 |
| 4,952,033 A * | 8/1990 | Davis ............................ 358/300 |
| 5,326,174 A * | 7/1994 | Parker ........................... 374/134 |
| 5,418,640 A * | 5/1995 | Hood ............................. 359/265 |
| 6,104,530 A | 8/2000 | Okamura et al. |
| 6,228,804 B1 * | 5/2001 | Nakashima .................... 503/226 |
| 6,416,853 B1 * | 7/2002 | Nakashima et al. ........ 428/313.9 |
| 6,783,901 B1 * | 8/2004 | Hawkins et al. ............... 430/20 |
| 6,872,453 B2 * | 3/2005 | Arnaud et al. ................ 428/432 |
| 7,311,976 B2 | 12/2007 | Arnaud et al. |
| 7,483,212 B2 | 1/2009 | Cho et al. |
| 7,768,693 B2 * | 8/2010 | McCarthy et al. ............ 359/326 |

(Continued)

FOREIGN PATENT DOCUMENTS

JP     11-167744     6/1999

(Continued)

OTHER PUBLICATIONS

KIPO Registration Determination Certificate dated Apr. 27, 2012, for Korean priority Patent application 10-2010-0075668, (5 pages).

(Continued)

*Primary Examiner* — Loha Ben
(74) *Attorney, Agent, or Firm* — Christie, Parker & Hale, LLP

(57) ABSTRACT

A variable light transmittance window includes: a substrate configured to transmit light; a thermochromic layer on the substrate; first function thin film layers on opposite surfaces of the thermochromic layer; and second function thin film layers on respective surfaces of the first function thin film layers opposite the thermochromic layer, wherein a difference between refractive indices of the first function thin film layers and the second function thin film layers is greater than a difference between refractive indices of the first function thin film layers and the thermochromic layer.

19 Claims, 4 Drawing Sheets

U.S. PATENT DOCUMENTS

| | | |
|---|---|---|
| 2002/0037421 A1 | 3/2002 | Arnaud et al. |
| 2010/0045924 A1* | 2/2010 | Powers et al. ............... 349/190 |
| 2011/0111147 A1* | 5/2011 | Agrawal et al. ............... 428/34 |
| 2011/0164306 A1* | 7/2011 | Shim et al. .................. 359/289 |
| 2011/0216254 A1* | 9/2011 | McCarthy et al. .............. 349/16 |

FOREIGN PATENT DOCUMENTS

| | | |
|---|---|---|
| JP | 2001-154433 A | 6/2001 |
| JP | 2002 086606 A1 | 3/2002 |
| JP | 2008-297177 | 12/2008 |
| KR | 1994-0011127 B1 | 11/1999 |
| KR | 10-0862447 B1 | 10/2008 |

OTHER PUBLICATIONS

Patent Abstracts of Japan, and English machine translation of Japanese Publication 11-167744, listed above, (68 pages), Jun. 22, 1999.
Patent Abstracts of Japan, and English machine translation of Japanese Publication 2008-297177, listed above, (24 pages).

* cited by examiner

VARIABLE LIGHT TRANSMITTANCE WINDOW

RELATED APPLICATIONS

This application claims the benefit of Korean Patent Application No. 10-2010-0075668, filed on Aug. 5, 2010, in the Korean Intellectual Property Office, the disclosure of which is incorporated herein in its entirety by reference.

BACKGROUND

1. Field

One or more embodiments of the present invention relate to a window having a light transmittance that varies according to a surrounding temperature.

2. Description of Related Art

A smart window adjusts transmission of solar light. A material for adjusting the transmission of solar light is directly applied on the smart window, and by doing so, it is possible to significantly increase the transmission of solar light and to provide user convenience, when compared to a method of attaching a film having a particular fixed transmission to a window.

According to types of materials utilized, a smart window may be classified as a liquid crystal material, a suspended particle display (SPD), an electrochromic (EC) material, a photochromic (PC) material, or a thermochromic material, among others.

From among the aforementioned materials, the transmission of solar light on a thermochromic smart window varies according to temperature. Generally, reflectance of a thermochromic smart window is relatively high at a temperature equal to or greater than a particular (e.g., a threshold) temperature, and transmission of the thermochromic smart window is relatively high at a temperature equal to or less than the particular temperature, with respect to infrared rays having wavelengths greater than those of visible rays. In the winter when an outdoor temperature is low, since the transmission of the thermochromic smart window is higher with respect to infrared rays that emit heat, the thermochromic smart window transmits the infrared rays so that heating costs can be saved or reduced. On the other hand, in the summer when the outdoor temperature is high, since the transmission of the thermochromic smart window is lower with respect to infrared rays, the thermochromic smart window blocks the inflow of heat so that cooling costs can be saved or reduced.

However, as illustrated in FIG. 1, transmittance with respect to solar rays in a visible ray range (380-780 nm) of general glass is equal to or greater than 90%, while, as illustrated in FIG. 2, transmittance with respect to solar rays in a visible ray range of a glass having a thermochromic layer formed therein deteriorates by about 30% or more.

SUMMARY

One or more embodiments of the present invention include a variable light transmittance window that may increase an energy efficiency in cooling and heating operations by using a function of a thermochromic layer, while increasing transmittance in a visible ray range.

Additional aspects will be set forth in part in the description which follows and will be apparent from the description, or may be learned by practice of the presented embodiments.

According to one or more embodiments of the present invention, a variable light transmittance window includes a substrate configured to transmit light; a thermochromic layer on the substrate; first function thin film layers on opposite surfaces of the thermochromic layer; and second function thin film layers on respective surfaces of the first function thin film layers opposite the thermochromic layer, wherein a difference between refractive indices of the first function thin film layers and the second function thin film layers is greater than a difference between refractive indices of the first function thin film layers and the thermochromic layer.

One of the second function thin film layers, one of the first function thin film layers, the thermochromic layer, another one of the first function thin film layers, and another one of the second function thin film layers may be sequentially stacked on the substrate.

The substrate may include glass.

The thermochromic layer may include vanadium dioxide.

The refractive index of the first function thin film layers may be greater than the refractive index of the second function thin film layers. For example, the difference between the refractive indices of the first function thin film layers and the second function thin film layers may be equal to or greater than 0.5. For example, the first function thin film layers may have a refractive index that is equal to or greater than 2.0, and the second function thin film layers may have a refractive index that is equal to or less than 1.5.

The refractive indices may decrease from the thermochromic layer to the first function thin film layers, and from the first function thin film layers to the second function thin film layers.

The first function thin film layers may include a material selected from the group consisting of titanium dioxide ($TiO_2$), bismuth oxide ($Bi_2O_3$), chromium oxide ($Cr_2O_3$), gadolinium oxide ($Gd_2O_3$), germanium (Ge), indium tin oxide (ITO), lead telluride (PbTe), and tantalum oxide ($Ta_2O_5$).

The first function thin film layers may include titanium dioxide ($TiO_2$) and at least one of vanadium (V) or chromium (Cr).

The second function thin film layers may include a material selected from the group consisting of silicon dioxide ($SiO_2$), calcium fluoride ($CaF_2$), lead fluoride ($PbF_2$), and strontium fluoride ($SrF_2$).

According to one or more embodiments of the present invention, a variable light transmittance window includes a substrate configured to transmit light; a thermochromic layer on the substrate; a first function thin film layer on the thermochromic layer; and a second function thin film layer on the first function thin film layer, wherein a difference between refractive indices of the first function thin film layer and the second function thin film layer is greater than a difference between refractive indices of the first function thin film layer and the thermochromic layer.

BRIEF DESCRIPTION OF THE DRAWINGS

These and/or other aspects will become apparent and more readily appreciated from the following description of the embodiments, taken in conjunction with the accompanying drawings, of which.

DETAILED DESCRIPTION

Figure 1:
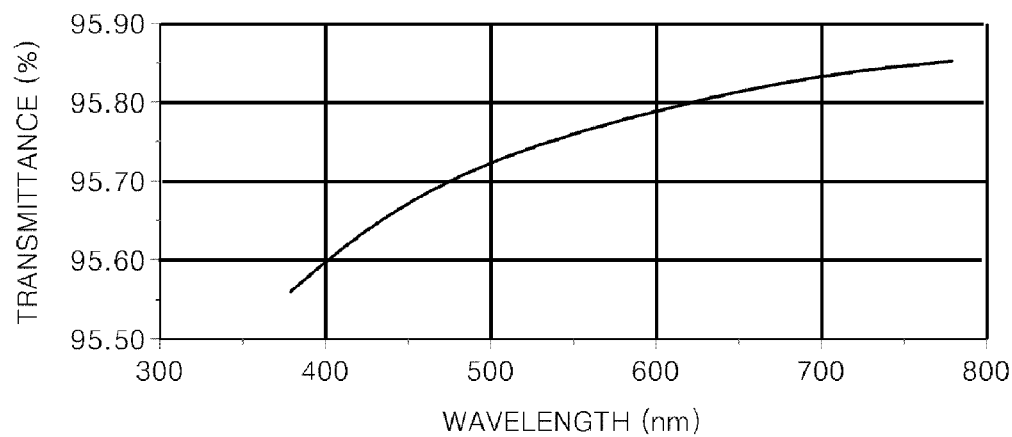
FIG. 1 is a graph illustrating light transmittance with respect to wavelengths in general glass.
Figure 2:
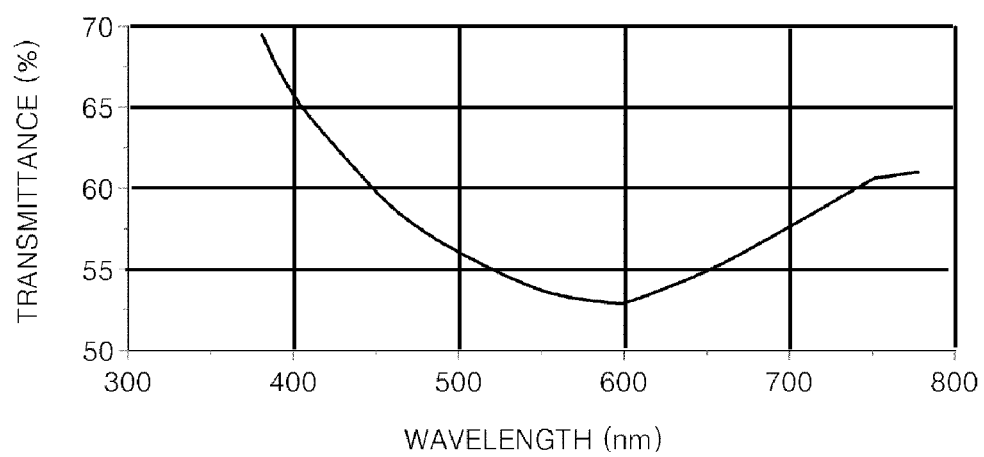
FIG. 2 is a graph illustrating light transmittance with respect to wavelengths in glass having a thermochromic layer formed therein.

Reference will now be made in detail to embodiments, examples of which are illustrated in the accompanying drawings, wherein like reference numerals refer to like elements throughout. In this regard, the present embodiments may have various different forms and should not be construed as being limited to the descriptions set forth herein. Accordingly, the embodiments are merely described below, in reference to the figures, to explain various aspects of the present invention.

Figure 3:
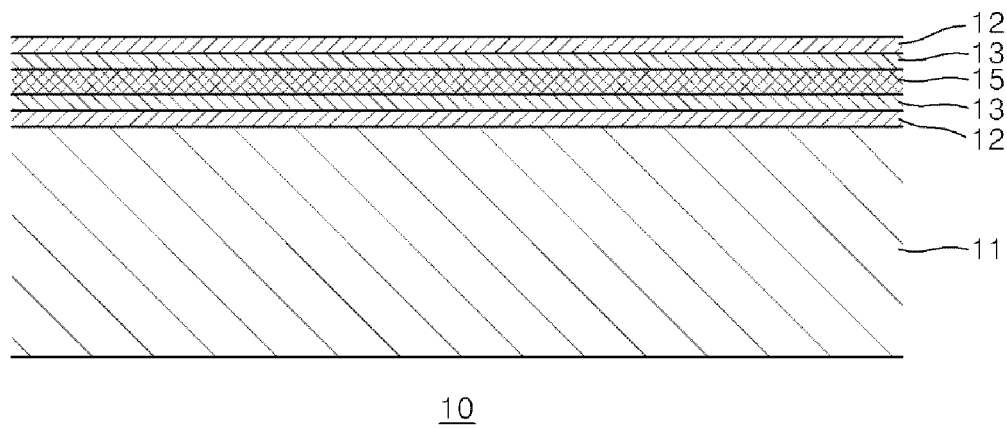
FIG. 3 is a cross-sectional view of a variable light transmittance window according to an embodiment of the present invention.
Figure 4:
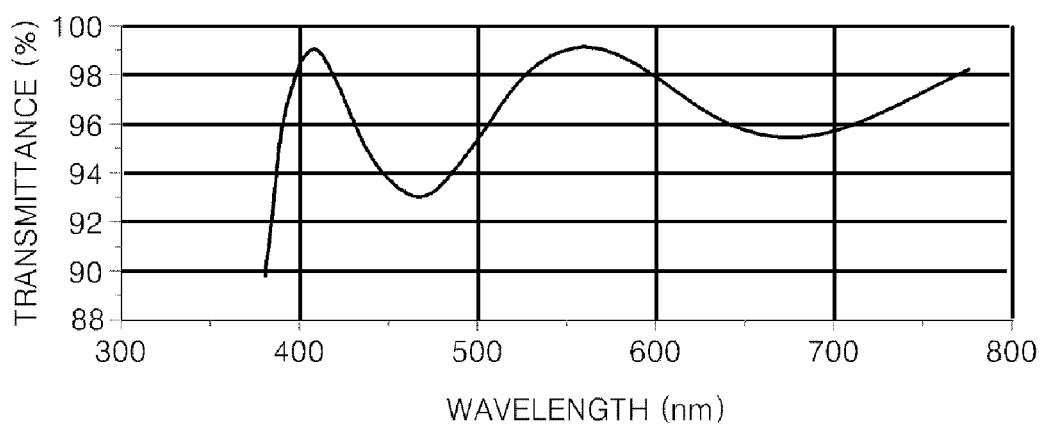
FIG. 4 is a graph illustrating light transmittance with respect to wavelengths in the variable light transmittance window of FIG. 3.

FIG. 3 is a cross-sectional view of a variable light transmittance window 10 according to an embodiment of the present invention. FIG. 4 is a graph illustrating light transmittance with respect to wavelengths in the variable light transmittance window of FIG. 3.

The variable light transmittance window 10 according to the present embodiment is formed of a glass 11, which may serve as a substrate, and a variable light transmittance layer formed on the glass 11. The variable light transmittance layer includes a thermochromic layer 15, a first function thin film layer 13 formed on both surfaces of the thermochromic layer 15, and a second function thin film layer 12 formed on both surfaces of the first function thin film layer 13. That is, the glass 11, the second function thin film layer 12 having a low dielectric constant, the first function thin film layer 13 having a high dielectric constant, the thermochromic layer 15, the first function thin film layer 13 having the high dielectric constant, and the second function thin film layer 12 having the low dielectric constant may be sequentially stacked from the bottom up.

The thermochromic layer 15 may be formed of a vanadium dioxide-based material.

The first function thin film layer 13 may be formed of a high dielectric material having a high refractive index equal to or greater than 2.0. For example, the first function thin film layer 13 may include titanium dioxide ($TiO_2$), bismuth oxide ($Bi_2O_3$), chromium oxide ($Cr_2O_3$), gadolinium oxide ($Gd_2O_3$), germanium (Ge), indium tin oxide (ITO), lead telluride (PbTe), tantalum oxide ($Ta_2O_5$), and the like.

The second function thin film layer 12 may be formed of a low dielectric material having a low refractive index equal to or less than 1.5. For example, the second function thin film layer 12 may include silicon dioxide ($SiO_2$), calcium fluoride ($CaF_2$), lead fluoride ($PbF_2$), strontium fluoride ($SrF_2$), and the like.

Refractive indices of the present embodiment are shown in Table 1, wherein the present embodiment corresponds to a case in which the first function thin film layer 13 is formed of $TiO_2$ and the second function thin film layer 12 is formed of $SiO_2$,

TABLE 1

| layer | material | refractive index |
| --- | --- | --- |
| medium | air | 1.00000 |
| second function thin film layer | $SiO_2$ | 1.45992 |
| first function thin film layer | $TiO_2$ | 2.31836 |
| thermochromic layer | $VO_2$ | 2.82610 |
| first function thin film layer | $TiO_2$ | 2.31836 |
| second function thin film layer | $SiO_2$ | 1.45992 |
| substrate | glass | 1.51852 |

As shown above, the first function thin film layers 13, having a refractive index similar to that of the thermochromic layer 15, are arranged as layers neighboring with or adjacent to the thermochromic layer 15. A refractive index difference between the thermochromic layer 15 and its neighboring layers may be small (e.g., as small as possible). By doing so, reflectance at an interface of the thermochromic layer 15 is decreased, so that transmittance in a visible ray range of the variable light transmittance window may be increased.

The $TiO_2$ layer serving as the first function thin film layer 13 in the present embodiment is adjacent to the thermochromic layer 15, prevents oxidation of the thermochromic layer 15, and has a self-cleaning characteristic, thereby enhancing durability of a multi-thin film layer.

Also, the second function thin film layers 12, having a refractive index that is different from the refractive index of the first function thin film layers 13 are arranged as layers neighboring with or adjacent to the first function thin film layers 13, for example, on a side of the first function thin film layers 13 opposite the thermochromic layer 15. The difference between the refractive indices of the first and second function thin film layers 13 and 12 may be large (e.g., as large as possible). When refractive indices of thin film layers are n1 and n2, respectively, reflectance is obtained by using Equation $[(n1-n2)/(n1+n2)]^2$. Thus, as the difference between the refractive indices of the thin film layers increases, the reflectance increases. By doing so, reflection occurs at interfaces between the first function thin film layers 13 having the high dielectric constant and the second function thin film layers 12 having the low dielectric constant, and lights reflected from the interfaces overlap with each other to affect interference.

The $SiO_2$ layer serving as the second function thin film layer 12 in the present embodiment is adjacent to the $TiO_2$ layer, so that durability of the $SiO_2$ layer is enhanced.

Here, a thickness of each layer of the first and second function thin film layers may be ¼ of a wavelength λ of light. In the case of two reflective surfaces having different refractive indices, lights reflected from the two reflective surfaces interfere with each other to determine a final reflectance. In this regard, when a thickness of a layer corresponding to a distance between the two reflective surfaces is (¼)λ, light reflected from the second reflective surface is delayed or offset by (½)λ with respect to light reflected from the first reflective surface, so that destructive interference occurs between the two reflected lights due to a 180 degree phase difference. As such, reflectance is decreased, and transmittance is increased. More specifically, when the first reflective surface and the second reflective surface exist, if reflection occurs at the first reflective surface and the second reflective surface at a same phase shift or difference, reflectance is increased due to constructive interference, but if reflection occurs at the first reflective surface and the second reflective surface at an opposite phase shift or difference, reflectance is decreased due to destructive interference. By having a sufficient or appropriate distance between the two reflective surfaces to cause destructive interference, the two reflective surfaces may have or form an anti-reflection characteristic or property.

In addition to $TiO_2$, a small amount of vanadium (V), chromium (Cr), and the like may be added to the first function thin film layers 13. Since $TiO_2$ has a high bandgap of 3.2 eV, if a small amount of vanadium (V), chromium (Cr), and/or the like are added to $TiO_2$, so as to function as a visible ray responsive-type catalyst, a band absorbing portion is moved, so that activity of the visible ray range may be increased.

Referring to FIG. 4, it is evident that the variable light transmittance window having a configuration shown in FIG. 3 has achieved about a 30% increase in the transmittance of the visible ray range, compared to a configuration only having the thermochromic layer 15.

Figure 5:
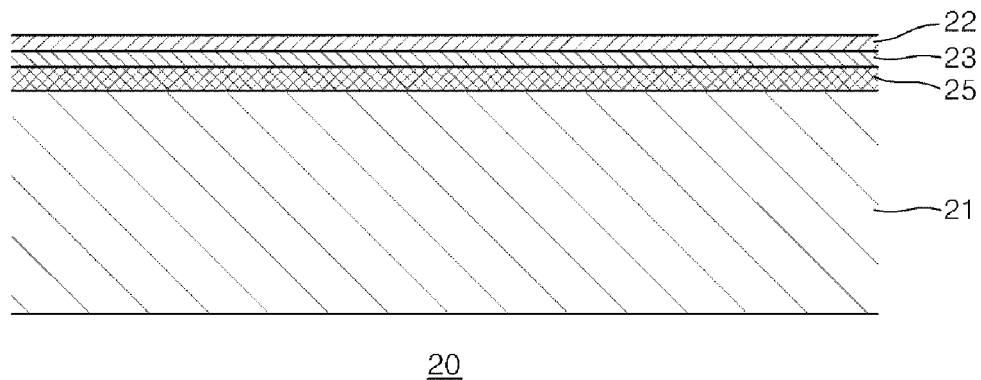
FIG. 5 is a cross-sectional view of a variable light transmittance window according to another embodiment of the present invention.
Figure 6:
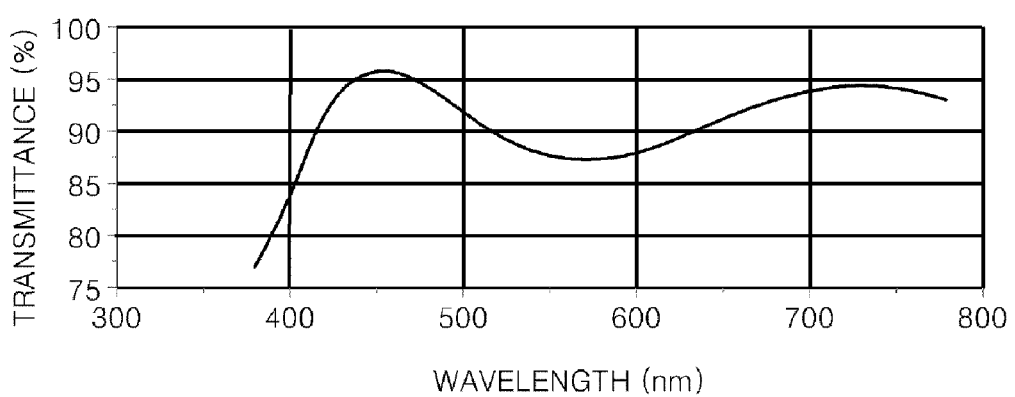
FIG. 6 is a graph illustrating light transmittance with respect to wavelengths in the variable light transmittance window of FIG. 5.

FIG. 5 is a cross-sectional view of a variable light transmittance window 20 according to another embodiment of the present invention. FIG. 6 is a graph illustrating light transmittance with respect to wavelengths in the variable light transmittance window of FIG. 5.

The variable light transmittance window 20 according to the present embodiment is formed of a glass 21, which may serve as a substrate, and a variable light transmittance layer formed on the glass 21. The variable light transmittance layer includes a thermochromic layer 25, a first function thin film layer 23 formed on a surface of the thermochromic layer 25, and a second function thin film layer 22 formed on a surface of the first function thin film layer 23. That is, the glass 21, the thermochromic layer 25, the first function thin film layer 23 having a high dielectric constant, and the second function thin film layer 22 having a low dielectric constant may be sequentially stacked from the bottom up.

In the present embodiment, the first function thin film layer 23 and the second function thin film layer 22 may be the same as or similar to those of FIG. 3, and thus descriptions thereof are not provided here.

Refractive indices of the present embodiment are shown in Table 2, wherein the present embodiment corresponds to a case in which the first function thin film layer 23 is formed of $TiO_2$ and the second function thin film layer 22 is formed of $SiO_2$.

TABLE 2

| layer | material | refractive index |
| --- | --- | --- |
| medium | air | 1.00000 |
| second function thin film layer | $SiO_2$ | 1.45992 |
| first function thin film layer | $TiO_2$ | 2.31836 |
| thermochromic layer | $VO_2$ | 2.82610 |
| substrate | glass | 1.51852 |

As shown above, the first function thin film layer 23, having a refractive index similar to that of the thermochromic layer 25, is arranged as a layer neighboring with or adjacent to the thermochromic layer 25. A refractive index difference between the thermochromic layer 25 and the first function thin film layer 23 may be small (e.g., as small as possible). By doing so, reflectance at an interface of the thermochromic layer 25 is decreased, so that transmittance in a visible ray range of the variable light transmittance window is increased.

Also, the second function thin film layer 22 having a refractive index that is different from the refractive index of the first function thin film layer 23 is arranged as a layer neighboring with or adjacent to the first function thin film layer 23 on a side of the first function thin film layer 23 opposite the thermochromic layer 25. The difference between the refractive indices of the first and second function thin film layers 23 and 22 may be large (e.g., as large as possible). By doing so, reflection occurs at an interface between the first function thin film layer 23 having the high dielectric constant and the second function thin film layer 22 having the low dielectric constant, and lights reflected from the reflective surfaces overlap with or interfere with each other to affect interference.

The $SiO_2$ layer serving as the second function thin film layer 22 in the present embodiment is adjacent to the $TiO_2$ layer, so that durability of the $SiO_2$ layer is enhanced.

Referring to FIG. 6, it is evident that the variable light transmittance window having a configuration shown in FIG. 5 has achieved about a 20% increase in the transmittance of the visible ray range, compared to a configuration only having the thermochromic layer 25.

Figure 7:
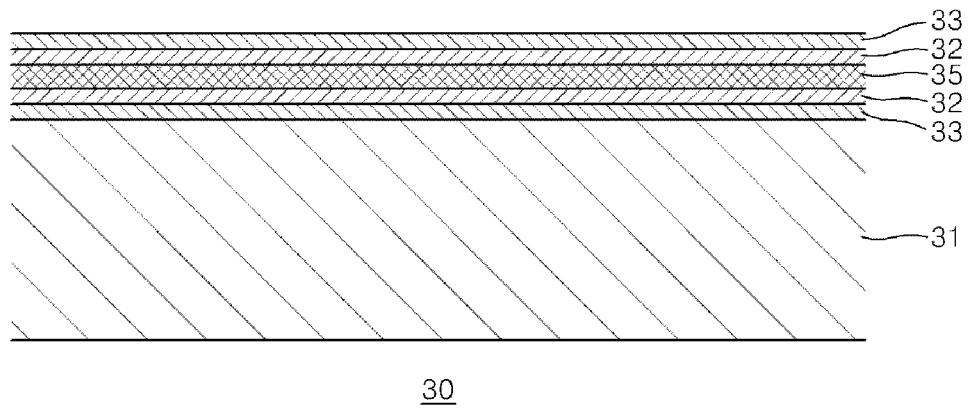
FIG. 7 is a cross-sectional view of a variable light transmittance window according to a comparative example.
Figure 8:
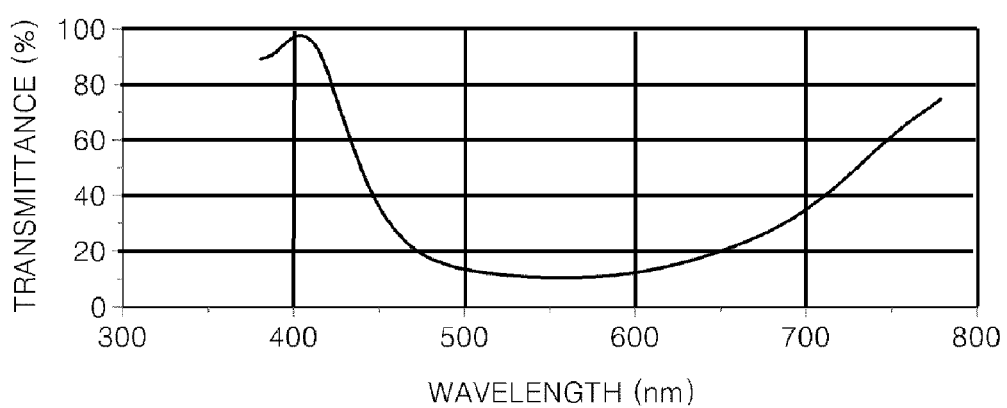
FIG. 8 is a graph illustrating light transmittance with respect to wavelengths in the variable light transmittance window of FIG. 7.

FIG. 7 is a cross-sectional view of a variable light transmittance window 30 according to a comparative example. FIG. 8 is a graph illustrating light transmittance with respect to wavelengths in the variable light transmittance window of FIG. 7.

In the variable light transmittance window 30 according to the comparative example, a glass 31, a first function thin film layer 33 having a high dielectric constant, a second function thin film layer 32 having a low dielectric constant, a thermochromic layer 35, a second function thin film layer 32 having a low dielectric constant, and a first function thin film layer 33 having a high dielectric constant are sequentially stacked from the bottom up. That is, compared to the aforementioned embodiments, the comparative example is different in that the second function thin film layers 32 having a low dielectric constant are arranged as layers neighboring with or adjacent to the thermochromic layer 35.

Referring to FIG. 8, it is evident that a transmittance of a visible ray range in the variable light transmittance window having a configuration shown in FIG. 7 has further decreased, compared to the variable light transmittance window only having the thermochromic layer 35. This is because the thermochromic layer 35 is added and then the first and second function thin film layers 33 and 32 are further added in the above arrangement, such that transparency of the variable light transmittance window deteriorates.

Smart windows formed by applying variable light transmittance windows according to the first and second embodiments respectively include the thermochromic layers 15 and 25 in which transmittance is gradually changed around a threshold temperature. That is, the smart windows have a characteristic that the transmittance of the smart windows are relatively low at a temperature equal to or greater than a particular temperature, and the transmittance of the smart windows is relatively high at a temperature equal to or less than the particular temperature, with respect to infrared rays having wavelengths greater than those of visible rays. By doing so, in the winter when an outdoor temperature is low, since the transmittance of the smart windows is higher with respect to infrared rays emitting heat, the smart windows transmit the infrared rays so that heating costs can be saved. On the other hand, in the summer when the outdoor temperature is high, since the transmittance of the smart windows is lower with respect to infrared rays, the smart windows block the inflow of heat so that cooling costs can be saved.

In particular, in order to prevent or reduce a decrease in transmittance due to the forming of the thermochromic layers 15 or 25, the first function thin film layers 13 and 23 having a high dielectric constant are formed as layers respectively neighboring with or adjacent to the thermochromic layers 15 and 25 having a high dielectric constant, and the second function thin film layers 12 and 22 having a low dielectric constant are formed on the first function thin film layers 13 and 23, respectively, so as to form a large refractive index difference, so that the decrease of the transmittance may be minimal or reduced. By doing so, oxidation of the thermochromic layers 15 and 25 is also prevented or reduced, so that the durability of the multi-thin film layer may also be enhanced.

The variable light transmittance windows according to embodiments of the present invention are configured in a manner that an energy efficiency in cooling and heating operations is increased due to the thermochromic layer, while additional functional layers are appropriately arranged, such that the transmittance of the visible ray range may be increased. In addition, due to the function layers formed on the thermochromic layer, the durability of the thermochromic layer may also be enhanced.

Embodiments of the present invention may be used in various industrial fields, including but not limited to smart windows.

It should be understood that the exemplary embodiments described herein should be considered in a descriptive sense only, and not for purposes of limitation. Descriptions of features or aspects within each embodiment should be considered as available for other similar features or aspects in other embodiments. It should also be understood that the invention is intended to cover various modifications and equivalent arrangements included within the spirit and scope of the appended claims, and equivalents thereof.

What is claimed is:

1. A variable light transmittance window comprising:
   a substrate configured to transmit light;
   a thermochromic layer on the substrate;
   first function thin film layers on opposite surfaces of the thermochromic layer; and
   second function thin film layers on respective surfaces of the first function thin film layers opposite the thermochromic layer,
   wherein a difference between refractive indices of the first function thin film layers and the second function thin film layers is greater than a difference between refractive indices of the first function thin film layers and the thermochromic layer.

2. The variable light transmittance window of claim 1, wherein one of the second function thin film layers, one of the first function thin film layers, the thermochromic layer, another one of the first function thin film layers, and another one of the second function thin film layers are sequentially stacked on the substrate.

3. The variable light transmittance window of claim 1, wherein the substrate comprises glass.

4. The variable light transmittance window of claim 1, wherein the thermochromic layer comprises vanadium dioxide.

5. The variable light transmittance window of claim 1, wherein the refractive index of the first function thin film layers is greater than the refractive index of the second function thin film layers.

6. The variable light transmittance window of claim 5, wherein the difference between the refractive indices of the first function thin film layers and the second function thin film layers is greater than or equal to 0.5.

7. The variable light transmittance window of claim 6, wherein the first function thin film layers have a refractive index that is greater than or equal to 2.0, and the second function thin film layers have a refractive index that is less than or equal to 1.5.

8. The variable light transmittance window of claim 7, wherein the refractive indices decrease from the thermochromic layer to the first function thin film layers, and from the first function thin film layers to the second function thin film layers.

9. The variable light transmittance window of claim 8, wherein the first function thin film layers comprise a material selected from the group consisting of titanium dioxide ($TiO_2$), bismuth oxide ($Bi_2O_3$), chromium oxide ($Cr_2O_3$), gadolinium oxide ($Gd_2O_3$), germanium (Ge), indium tin oxide (ITO), lead telluride (PbTe), and tantalum oxide ($Ta_2O_5$).

10. The variable light transmittance window of claim 9, wherein the first function thin film layers comprise titanium dioxide ($TiO_2$) and at least one of vanadium (V) or chromium (Cr).

11. The variable light transmittance window of claim 8, wherein the second function thin film layers comprise a material selected from the group consisting of silicon dioxide ($SiO_2$), calcium fluoride ($CaF_2$), lead fluoride ($PbF_2$), and strontium fluoride ($SrF_2$).

12. The variable light transmittance window of claim 1, wherein a thickness of at least one of the first function thin film layers or the second function thin film layers is approximately ¼ of a wavelength of light.

13. The variable light transmittance window of claim 1, wherein reflected light reflected off of a second surface formed by the layers of the variable light transmittance window is offset by approximately ½ of a wavelength with respect to reflected light reflected off of a first surface formed by the layers of the variable light transmittance window.

14. A variable light transmittance window comprising:
   a substrate configured to transmit light;
   a thermochromic layer on the substrate;
   a first function thin film layer on the thermochromic layer; and
   a second function thin film layer on the first function thin film layer,
   wherein a difference between refractive indices of the first function thin film layer and the second function thin film layer is greater than a difference between refractive indices of the first function thin film layer and the thermochromic layer.

15. The variable light transmittance window of claim 14, wherein the substrate comprises glass.

16. The variable light transmittance window of claim 14, wherein the refractive index of the first function thin film layer is greater than the refractive index of the second function thin film layer.

17. The variable light transmittance window of claim 16, wherein the difference between the refractive indices of the first function thin film layer and the second function thin film layer is greater than or equal to 0.5.

18. The variable light transmittance window of claim 17, wherein the first function thin film layer has a refractive index that is greater than or equal to 2.0, and the second function thin film layer has a refractive index that is less than or equal to 1.5.

19. The variable light transmittance window of claim 18, wherein the refractive indices decrease from the thermochromic layer to the first function thin film layer, and from the first function thin film layer to the second function thin film layer.

* * * * *